(12) United States Patent
Hatano

(10) Patent No.: US 9,557,032 B2
(45) Date of Patent: Jan. 31, 2017

(54) DISPLAY SYSTEM

(71) Applicant: NICHIA CORPORATION, Anan-shi (JP)

(72) Inventor: Tomohiko Hatano, Naruto (JP)

(73) Assignee: NICHIA CORPORATION, Anan-shi (JP)

( * ) Notice: Subject to any disclaimer, the term of this patent is extended or adjusted under 35 U.S.C. 154(b) by 135 days.

(21) Appl. No.: 14/667,681

(22) Filed: Mar. 25, 2015

(65) Prior Publication Data

US 2015/0276142 A1     Oct. 1, 2015

(30) Foreign Application Priority Data

Mar. 25, 2014   (JP) ................... 2014-061205

(51) Int. Cl.
    *F21V 11/16*         (2006.01)
    *G06F 3/14*          (2006.01)

(52) U.S. Cl.
    CPC ............ *F21V 11/16* (2013.01); *G06F 3/1446* (2013.01); *G09G 2300/026* (2013.01); *G09G 2340/145* (2013.01)

(58) Field of Classification Search
    CPC ................................ F21V 11/16; G06F 3/1446
    See application file for complete search history.

(56) References Cited

U.S. PATENT DOCUMENTS

| | | | |
|---|---|---|---|
| 6,545,685 B1* | 4/2003 | Dorbie | G06F 3/1438 345/582 |
| 2015/0192823 A1* | 7/2015 | Fu | G03F 7/2022 216/23 |

FOREIGN PATENT DOCUMENTS

| | | |
|---|---|---|
| JP | 11-305689 | 11/1999 |
| JP | 2000-181363 | 6/2000 |
| JP | 2002-14632 | 1/2002 |

* cited by examiner

*Primary Examiner* — David V Bruce
(74) *Attorney, Agent, or Firm* — Mori & Ward, LLP

(57) ABSTRACT

A display system includes a first display unit and a second display unit, each including a substrate having a plurality of light-emitting elements arranged in matrix, a mask disposed at a front side of the substrate, and a case having a main body supporting the substrate from its back side. The first display unit is arranged above the second display unit such that a gap is formed between the cases of the first display unit and the second display unit. The mask of the second display unit includes a plurality of canopy sections above and along each row of the plurality of light-emitting elements, except for an uppermost row. The main body of the case of the second display unit has a canopy section above and along the light-emitting elements in the uppermost row of the second display unit, at least partially covering the gap.

20 Claims, 11 Drawing Sheets

FIG. 1A
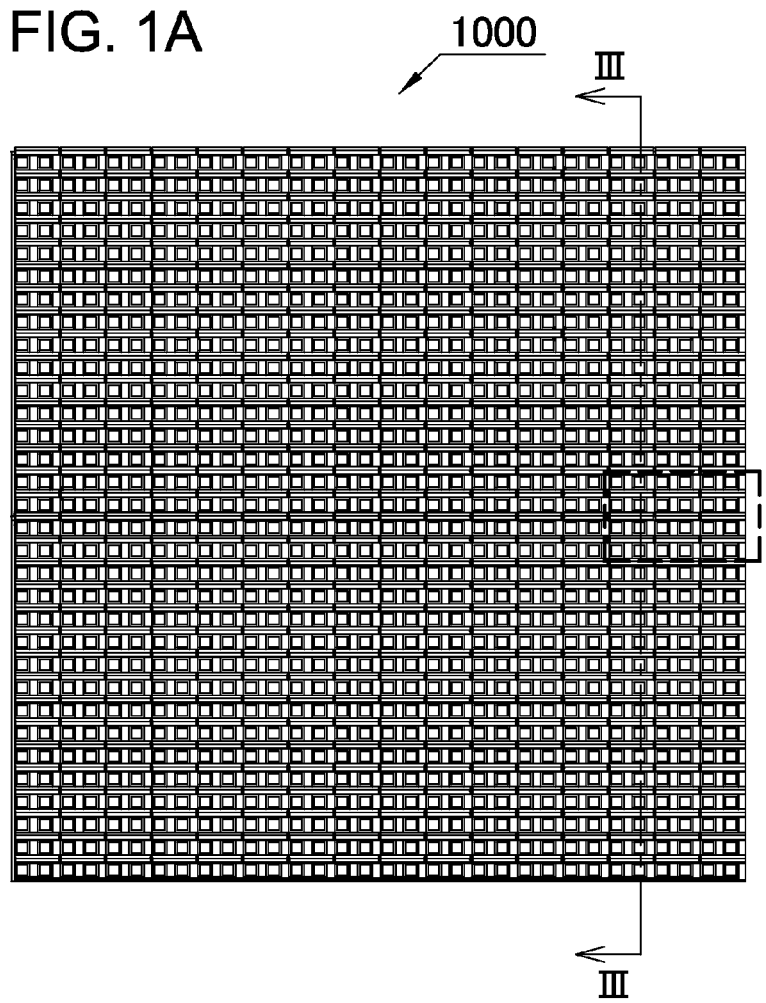
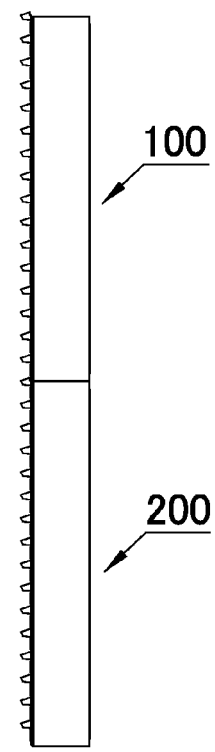
FIG. 1B
FIG. 1C
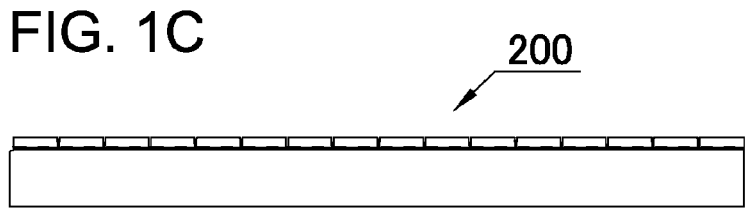

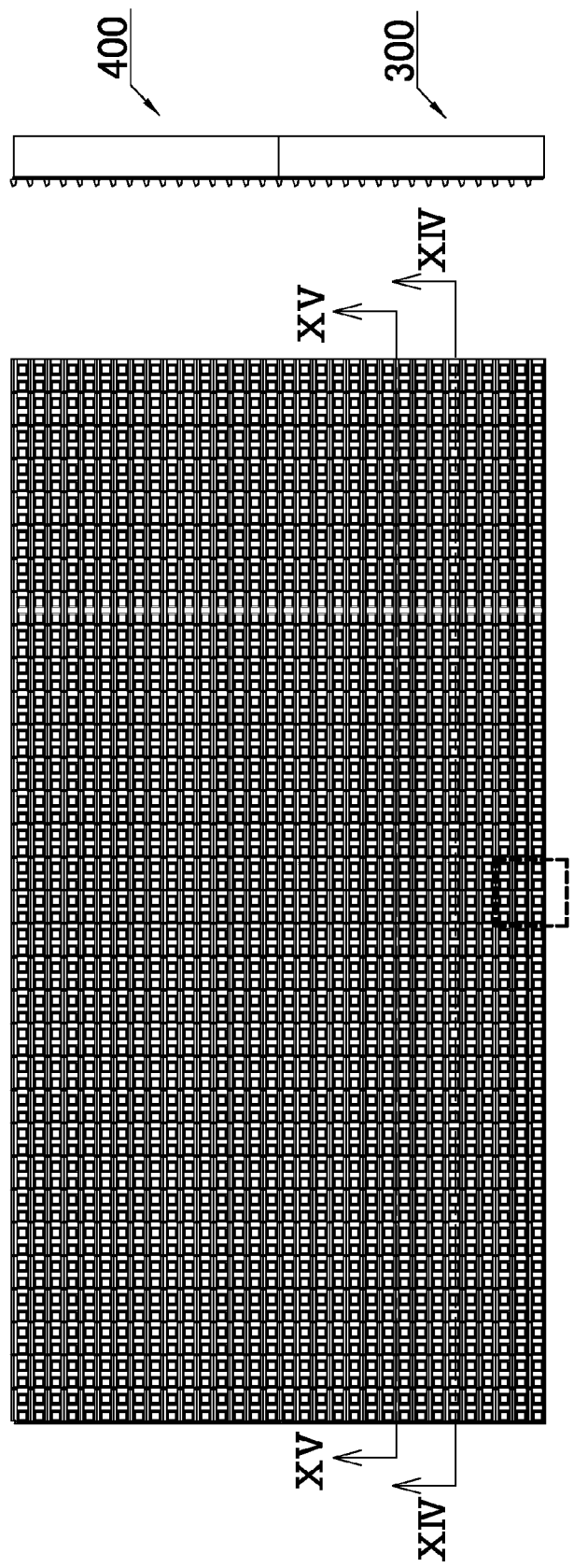
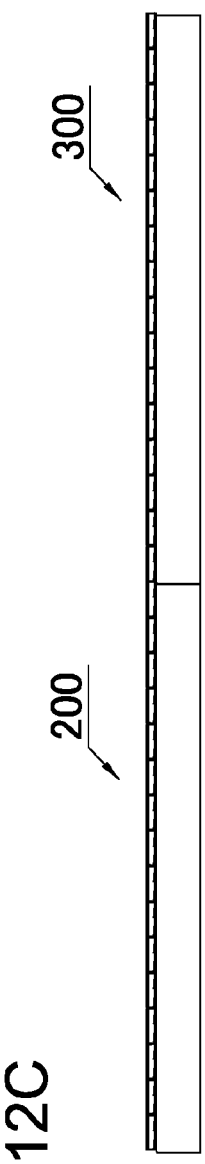
FIG. 12A
FIG. 12B
FIG. 12C

DISPLAY SYSTEM

CROSS-REFERENCE TO RELATED APPLICATIONS

The present application claims priority under 35 U.S.C. §119 to Japanese Patent Application No. 2014-061205, filed Mar. 25, 2014. The contents of this application are incorporated herein by reference in their entirety.

BACKGROUND OF THE INVENTION

1. Field of the Invention

The present invention relates to a display system including a plurality of display units.

2. Description of the Related Art

There has been known a large-screen display system configured by arranging a plurality of display units. For example, JP 2000-181363 A describes a display device provided by using a plurality of display units, each including: a front surface cover 1 including a light shielding unit 5 and a reflecting unit 6; an LED substrate 2; and an outer frame 3.

In the case of constituting a display system by vertically arranging a plurality of display units as disclosed in JP 2000-181363 A, a relatively narrow gap occurs between two adjacent display units. The gap occurred in this way is noticeable as a dark line when the display system is seen from the front side, which may result in degradation of display quality.

The present invention has made to solve the above problem. An object of the present invention is to provide a display system in which a gap between display units is made unnoticeable, which allows for higher display quality.

SUMMARY OF THE INVENTION

A display system according to an aspect of the present disclosure includes a first display unit and a second display unit, each includes a substrate on which a plurality of light-emitting elements are arranged in a plurality of rows and columns, a mask disposed at a front side of the substrate, and a case which has a main body supporting the substrate from a back side of the substrate. The first display unit is arranged above the second display unit such that a gap is formed between the main body of the case of the first display unit and the main body of the case of the second display unit. The mask of the second display unit includes a plurality of canopy sections each disposed above and along each of the plurality of rows of the plurality of light-emitting elements except for an uppermost row. The main body of the case of the second display unit is provided with a canopy section that is positioned above and along the plurality of light-emitting elements arranged in the uppermost row of the second display unit and that at least partially covers the gap.

A display system according to another aspect of the present disclosure includes a first display unit and a second display unit, each includes a substrate on which a plurality of light-emitting elements are arranged in a plurality of rows and columns, a mask disposed at a front side of the substrate, and a case disposed at a back side of the substrate. The first display unit is arranged above the second display unit such that a gap is formed between the case of the first display unit and the case of the second display unit. The mask includes a plurality of canopy sections each disposed above the plurality of light-emitting elements arranged along each of the rows. A canopy section at an uppermost of the plurality of canopy sections which are provided on the mask of the second display unit so that the uppermost canopy section at least partially cover the gap.

According to the present disclosure, the gap between the first display unit and the second display unit can be made unnoticeable so that a display system of excellent display quality can be provided.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A is a plan view seen from the front side, FIG. 1B is a side view seen from the side, and FIG. 1C is a bottom view seen from below of a display system according to a first embodiment.

FIG. 12A is a plan view seen from the front side, FIG. 12B is a side view seen from the side, and FIG. 12C is a bottom view seen from below respectively of a display system according to a fourth embodiment.

DESCRIPTION OF EMBODIMENTS

Figure 2:
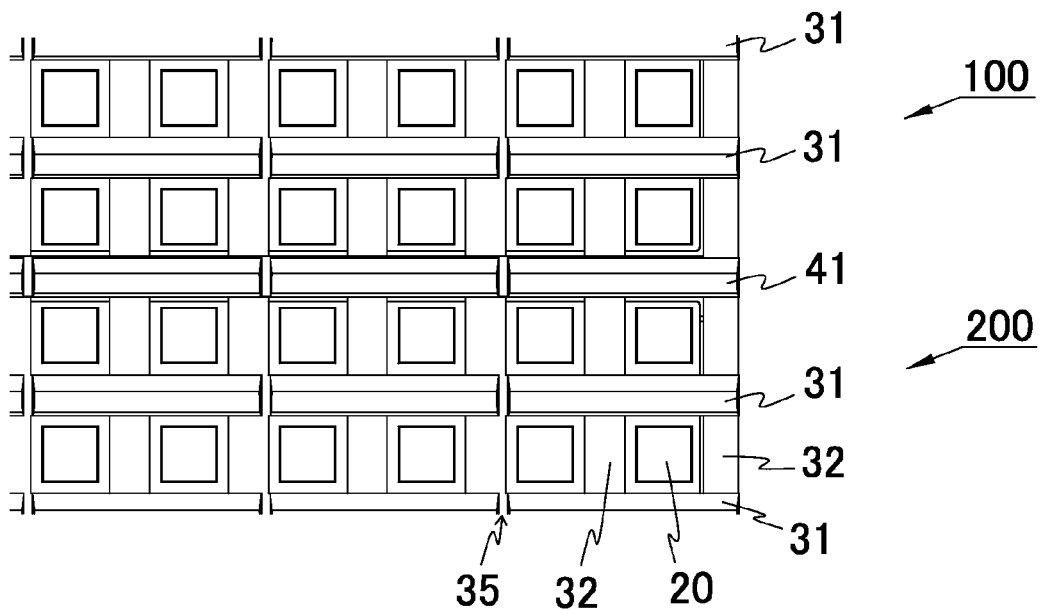
FIG. 2 is an enlarged plan view of a region surrounded by a dotted line in FIG. 1A.

The embodiments will now be described with reference to the accompanying drawings, wherein like reference numerals designate corresponding or identical elements throughout the various drawings. It should be noted that the embodiments described below are exemplifications for making concrete the technical idea of the present invention, and will not limit the present invention to the description below. Positions and sizes of materials shown in each of the drawings are exaggerated in some cases to clarify the description. The same names and symbols in principle indicate materials of the same or equivalent qualities, and redundant description will be omitted. In the present specification, "above" or "upper", "below" or "lower", "front", and "back" directions refer to directions in a state that the display system is installed upright on a wall or a pillar.

First Embodiment

Figure 3:
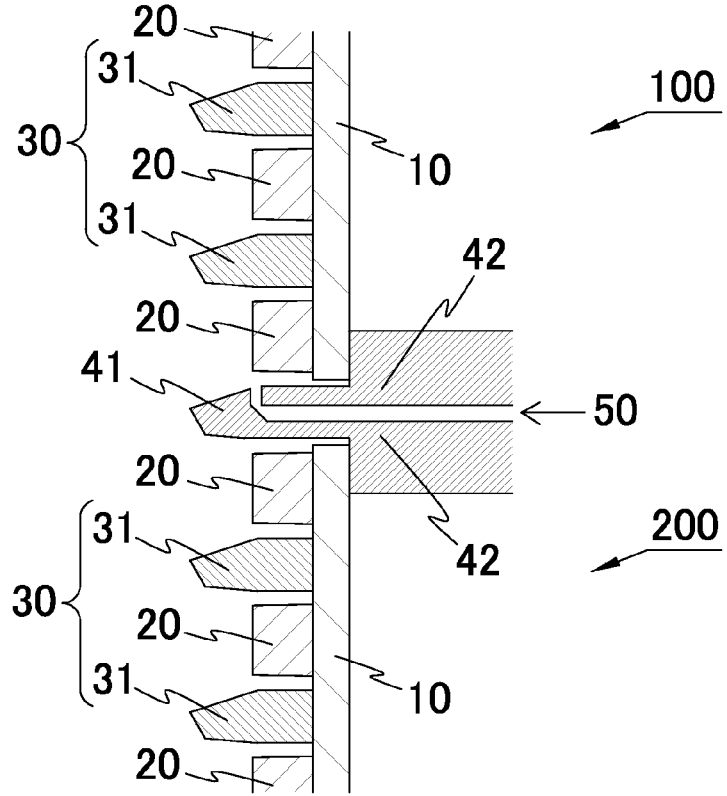
FIG. 3 is an enlarged cross-sectional view of a center region of the display system taken along line in FIG. 1A.
Figure 4:
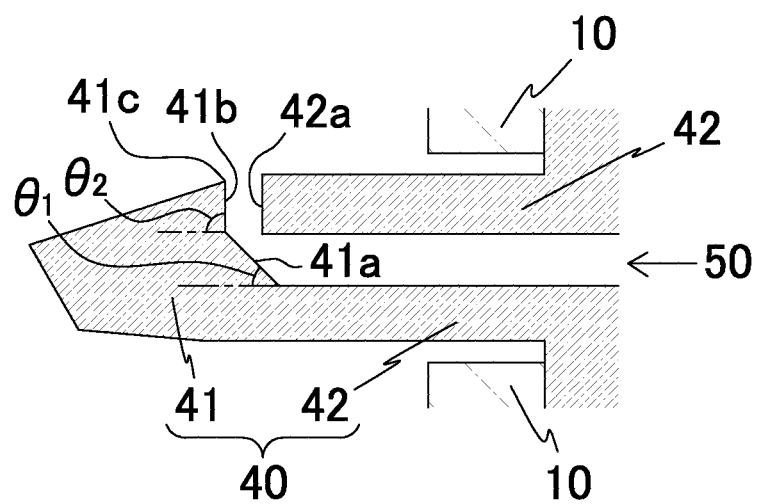
FIG. 4 is an enlarged sectional view near a canopy section 41 in FIG. 3.

A display system 1000 according to a first embodiment will be described with reference to FIG. 1A to FIG. 4. FIG. 1A is a plan view of the display system 1000 seen from the front side, FIG. 1B is a side view of the display system 1000 seen from the side, and FIG. 1C is a bottom view of the display system 1000 seen from below. FIG. 2 is an enlarged plan view of a region surrounded by a dotted line in FIG. 1A. FIG. 3 is an enlarged sectional view of a center region of the display system 1000 of a sectional view along a line III-III in FIG. 1A (a line that passes through a plurality of light-emitting elements arranged vertically). FIG. 4 is an enlarged sectional view near a canopy section 41 in FIG. 3.

As shown in FIG. 1A to FIG. 4, the display system 1000 includes a first display unit 100 and a second display unit 200, each including a substrate 10 having a plurality of light-emitting elements 20 arranged in each of a plurality of rows, a mask 30 disposed at the front side of the substrate 10, and a case 40 having a main body 42 supporting the substrate 10 from a back side of the substrate 10. The first display unit 100 is arranged above the second display unit 200 such that a gap 50 is defined between the main body 42 of the case 40 of the first display unit 100 and the main body 42 of the case 40 of the second display unit 200. The mask 30 of the second display unit 200 includes a plurality of canopy sections 31 each disposed above and along each of the plurality of rows of the plurality of light-emitting elements 20 except for an uppermost row. The main body 42 of the case 40 of the second display unit 200 is provided with a canopy section 41 that is positioned above and along the plurality of light-emitting elements 20 arranged in the uppermost row of the second display unit 200 and that entirely covers the gap 50 when seen from the front side.

According to the display system 1000, because the gap 50 is entirely covered at the front side of the gap 50 by the canopy section 41 of the second display unit 200, the shadow generated in the gap 50 is not so noticeable. That is, the dark visual appearance of the gap 50 can be eliminated when the display system 1000 is seen from the front side, so that the display quality of the display system can be improved.

A method of manufacturing the display system 1000 will be described.

First, there are prepared the substrate 10 having a plurality of light-emitting elements 20 arranged in each of a plurality of rows, the mask 30 having a plurality of canopy sections 31 each disposed above and along each of the plurality of rows of the plurality of light-emitting elements 20 except for an uppermost row, and the case 40 having the main body 42 and the canopy section 41 positioned above and along the plurality of light-emitting elements 20 arranged in the uppermost row of the second display unit 200. Thereafter, the substrate 10 is supported from the back side by the main body 42 of the case 40, and the mask 30 is disposed at the front side of the substrate 10. The first display unit 100 is manufactured by having screwed the substrate 10, the mask 30, and the case 40 to be integrated together. The second display unit 200 is also manufactured by a method similar to that of manufacturing the first display unit 100.

Next, the display system 1000 is manufactured by disposing the first display unit 100 above the second display unit 200 such that the gap 50 is defined between the main body 42 of the case 40 of the first display unit 100 and the main body 42 of the case 40 of the second display unit 200. At this time, the canopy section 41 provided in the main body 42 of the case 40 of the second display unit 200 entirely covers the gap 50 when the display system 1000 is seen from the front side.

Hereinafter, main materials that constitute the display system 1000 will be described.

First Display Unit 100 and Second Display Unit 200

The display system 1000 includes at least the first display unit 100 and the second display unit 200 (hereinafter, also collectively referred to as "display unit"). Each display unit has the substrate 10, the light-emitting elements 20, the mask 30, and the case 40.

Substrate 10

The substrate 10 is for mounting a plurality of the light-emitting elements 20 to be described below on the front side that is a viewing side, and has a substantially flat plate-like shape. For the substrate 10, a glass epoxy resin can be typically used, but the material of the substrate 10 is not specifically limited. The substrate 10 of the dimensions, for example, a length of one side (a length in a longitudinal direction or a lateral direction in FIG. 1A) of 100 mm to 500 mm and a thickness (a length normal to the plane of FIG. 1A) of 0.5 mm to 2.0 mm can be used. In the present embodiment, a length in the vertical direction can be 100 mm, a length in the lateral direction can be 200 mm, and a thickness can be 1.6 mm. On the substrate 10, there is provided a wire (a copper foil, for example) for transmitting a current from the outside to each of the light-emitting elements 20.

Light-Emitting Element 20

The light-emitting element 20 is mounted on the surface of the substrate 10 by soldering, and an LED (light emitting diode) can be used. In the present embodiment, for the light-emitting element 20, there is used a surface-mount type LED for fixing an external terminal electrically connected to a semiconductor chip, to the surface of the substrate. However, it is also possible to use an insertion-mount type LED (a lamp type LED) which is fixed to the substrate by inserting its external terminal into the substrate, or a semiconductor chip is directly mounted on a substrate 10.

The light-emitting diode 20 of the dimensions, for example, in the case of a surface-mount type LED, a length of one side (a length in a longitudinal direction or a lateral direction in FIG. 1A) of 1.5 mm to 5.0 mm, and a thickness (a length normal to the plane of FIG. 1A) of 0.5 mm to 5.0 mm can be used. In the present embodiment, a surface-mount type LED having one side of 3.2 mm and a thickness of 2.7 mm is used as the light-emitting element 20.

A plurality of the light-emitting diodes 20 are disposed in a row direction (a lateral direction in FIG. 1A) and in a column direction (a vertical direction in FIG. 1A), respectively on the substrate 10. In the present embodiment, 512 light-emitting diodes 20 in total, that is, 16 rows times 32 columns, are disposed in each display unit.

In the present embodiment, when observing the whole display system 1000, the light-emitting elements are arranged at constant intervals between adjacent ones of a plurality of light-emitting elements 20 arranged in the row direction and the column direction. In the present embodiment, a distance between two adjacent light-emitting elements 20 is set to 3.6 mm, for both the interval in the row direction and the interval in the column direction. That is, because a length of the light-emitting element 20 in the present embodiment is 3.2 mm in both the vertical direction and the lateral direction, a distance between the centers of two adjacent light-emitting elements 20 is 6.8 mm.

Mask 30

The mask 30 is provided at the front side of the substrate 10 (that is, at the side of the substrate 10 at which the plurality of the light-emitting elements 20 are disposed). By providing the mask 30, the substrate 10 and the like can be prevented from being directly visually recognized from the front side, so that the display quality can be improved. Further, with the use of the mask 30 with a surface of a black color, the contrast can also be improved.

The type of the mask 30 can be suitably selected according to the type and the function of the light-emitting element 20. In the present embodiment, because the surface-mount type LED is used for the light-emitting element 20, the mask 30 has an opening part in the region corresponding to the light-emitting element 20, and other region is made up of a light-shielding member (for example, a light-shielding polycarbonate resin colored in black), as shown in FIG. 2. A size of the opening part is not necessarily required to match the size of the light-emitting element 20, and can be set larger than the size of the light-emitting element 20 as shown in FIG. 2. When the size of the opening part is larger than the size of the light-emitting element 20, in order to prevent water from entering the back side of the light-emitting element 20 from the space between the light-emitting element 20 and the opening part, a sealing member (a silicon resin, for example) can be injected into the space between the light-emitting element 20 and the opening part.

In the case of using a surface-mount type LED for the light-emitting element 20 and also providing a water-proof function to the display unit, a mask which has a region facing a light emitting element being made of a light-transmissive member (for example, a light-transmissive polycarbonate resin) to allow light from the light emitting element to pass through, and other regions are made of a member which contains a light-shielding member (for example, a light-shielding polycarbonate resin colored in black) can be used.

The mask 30 has a canopy section 31 made of a light-shielding member provided to project to the front side at the substrate 10 side on which the light-emitting element 20 is mounted so that a high contrast display can be obtained by preventing external light such as solar light from reaching the light-emitting element 20 and by making a shadow. As shown in FIG. 2 and FIG. 3, in the first embodiment, the mask 30 of each of the first display unit 100 and the second display unit 200 includes a plurality of canopy sections 31 each disposed above and along each of the plurality of rows of the plurality of light-emitting elements 20 except for an uppermost row, and a plurality of rib sections 32 that connect between adjacent canopy sections 31 in the column direction. The rib section 32 positioned at the uppermost of the mask 30 according to the first embodiment has a lower end connected to the canopy section 31 and has an upper end arranged proximity to an inner surface of the main body 42 of the case 40. The plurality of rib sections 32 arranged in each row may sandwich one light-emitting element as shown in FIG. 2, or may sandwich two or more light-emitting elements.

The interval between the canopy section 31 and the light-emitting element 20 and the height of the canopy section 31 can be set to values at which the light emitted from the light-emitting element 20 can be extracted without blocking the light while suppressing the external light from reaching the light-emitting element 20. For example, in FIG. 3, the distance from the center of the canopy section 31 to the center of the nearest light-emitting element 20 can be set to 3.4 mm, and the height of the canopy section 31 can be set to 5.7 mm. The height of the rib section 32 is preferably at a lower value than that of the height of the light-emitting element 20 so as not to block the light from the light-emitting element 20, and can be set to 2.5 mm, for example. The "height" described here means the distance from the front surface of the substrate 10 to the front direction. The canopy section 41 of the case 40 described below is also similar to the canopy section 31.

Case 40

The case 40 is provided at the back side of the substrate 10. The case 40 has the main body 42 for supporting the substrate 10 from the back side. As shown in FIG. 3, the main body 42 can be formed so that a step portion is formed on its inner surface to support the substrate 10 from the back side with the step portion, and so that a side wall is arranged at an outer side of the substrate 10 and also at a front side of the step portion to surround the substrate 10. In order to fix each of the substrate 10, the mask 30, and the case 40, the substrate 10, the mask 30, and the case 40 can be screwed in the state that the substrate 10 is sandwiched between the mask 30 and the case 40. Alternatively after screwing the substrate 10 and the case 20, the mask 30 can be fixed with a separate screw. This mode is also similar to a second embodiment, a third embodiment, and a fourth embodiment described below.

As shown in FIG. 2 and FIG. 3, at the uppermost of the main body 42 of the case 40 of the second display unit 200, there is provided the canopy section 41 above the plurality of light-emitting elements 20 arranged in the uppermost row of the second display unit, and the canopy section 41 covers the gap 50. As shown in FIG. 1A to 1C, the canopy section 41 of the second display unit 200 is preferably continuously extended from one side end to the other side end of the second display unit 200. Accordingly, the gap 50 extended in the lateral direction can be covered entirely by the canopy section 41, so that the gap 50 can be made completely unrecognizable. The canopy section 41 is a part of the case 40, and is independent of the mask 30, so that at the time of screwing the mask 30, even if a portion of the mask 30 which is subjected to be screwed is pulled toward the case 40, the angle of the canopy section 41 projecting forward does not change. Thus, reduction in the display quality can be suppressed.

Preferably, the canopy section 41 of the second display unit 200 includes a light shielding member for the same purpose as that of the canopy section 31 of the mask 30. Preferably, a material of the canopy section 41 is the same as that of the canopy section 31. For example, a material of the canopy section 41 is a light-shielding polycarbonate resin colored in black. As shown in FIG. 3, the canopy section 41 and the main body 42 of the case 40 are preferably formed an integral manner, but the case 40 may be constituted with different members.

As shown in FIG. 3, the canopy section 41 of the second display unit 200 is provided to entirely cover the gap 50. That is, the canopy section 41 of the second display unit 200 has a portion (hereinafter, also referred to as "upper projecting portion") that projects to an upper side from an upper-side outer surface of the main body 42 of the case 40 so as to entirely cover the gap 50. Accordingly, the gap 50 can be surely made unnoticeable when the display system is seen from the front side. The canopy section 41 of the second display unit 200 can also be formed to cover a part of the gap 50. In this case, when the display system is seen from the front side, the gap 50 cannot be entirely shadowed. However, the display quality can be improved in a certain degree. Further, as shown in FIG. 4, the canopy section 41 of the second display unit 200 can be also extended to cover a front surface 42a of the main body 42 of the case 40 of the first display unit 100. The main body 42 of the case 40 of the first display unit 100 can be also provided with the canopy section 41 so as to cover the gap between another display unit which to be placed above the first display unit 100.

The upper projecting portion of the canopy section 41 can have a surface extended upward from a front end part (a back end part of the upper projecting portion) of the upper-side outer surface of the main body 42, in a cross-sectional view in the up-down direction and front-back direction of the display system 1000. Alternatively, as shown in FIG. 4, the upper projecting portion of the canopy section 41 can have a first surface 41a extended obliquely upward at a first angle Θ1 toward the front side from the front end part of the upper-side outer surface of the main body 42, and a second surface 41b adjoins the first surface 41a at an upper side, extended obliquely upward or upward at a second angle Θ2 (the first angle ≤the second angle) and also facing a front surface 42a of the main body 42 of the case 40 of the first display unit 100. With both the first surface 41a and the second surface 41b, the root portion of the canopy section 41 can be formed gradually thicker to increase the strength of the canopy section 41. Further, because the change in the angle is gradual, it is possible to suppress the occurrence of a crack and the like at portions of the canopy section 41 where the angles change. Further, by arranging the upper projecting portion of the canopy section 41 spaced apart from the front surface 42a of the main body 42 of the case 40 of the first display unit 100, it is possible to suppress the canopy section 41 from being damaged at the time of installing the display unit. The first angle and the second angle can be set to 45 degrees and 90 degrees, respectively. The first angle and the second angle (θ1 and θ2 in FIG. 4) are defined as the angles between a surface that is perpendicular to the substrate 10 which is extending in the lateral direction and the first surface 41a and the second surface 41b, respectively.

A separation distance between the second surface 41b of the canopy section 41 of the second display unit 200 and the front surface 42a of the main body 42 of the case 40 of the first display unit 100 is preferably equal to or larger than 0.3 mm and equal to or smaller than 0.8 mm. When the separation distance is less than 0.3 mm, there is a high possibility that the display units are brought into contact with each other at the installation time. When the separation distance is larger than 0.8 mm, as the display system is seen from obliquely above at the front side, there is a risk that the space formed between the second surface 41b of the canopy section 41 of the second display unit 200 and the front surface 42a of the main body 42 of the case 40 of the first display unit 100 becomes noticeable as a shadow.

As shown in FIG. 3, it is preferable that in the second display unit 200, the front portion of the canopy section 41 that covers the gap 50 has a same shape as the front portion of other canopy section 31 positioned below the canopy section 41. It is more preferable that the front portions of all the canopy sections (31, 41) of the first display unit 100 and the second display unit 200 have a same shape. This is because a canopy section having a front portion of a different shape reflects an external light in a direction different from that by the other canopy sections, which causes difference in the view when seen from the front side, resulting in a degradation of display quality. The "shape of the front portion" described in this paragraph indicates the shape of a region at the front side of an upper front end 41c as a portion positioned at the uppermost of the canopy section 41 and at the upper end of the second surface 41b of the canopy section 41 shown in FIG. 4.

In the state shown in FIG. 3, there may be a need to detach the first display unit 100 from the front side for repair or the like. In this case, there is a possibility that the first display unit 100 is brought into contact with the canopy section 41 of the second display unit 200 positioned below the first display unit 100, and the canopy section 41 of the second display unit 200 is damaged. For this reason, the outer shape (in the first embodiment, the width in the vertical direction shown in FIG. 3) of the main body 42 of the case 40 of each display unit may be formed narrowing toward the back side in a stepwise form or a slope form. It is preferable that the inclination angle of the outer shape of the main body 42 of the case 40 is larger than a typical draft, and is 10 degrees to 30 degrees, more preferably 10 degrees to 15 degrees to a surface perpendicular to the surface of the substrate 10 on which the light-emitting element 20 is mounted. With the shape of the case 40 as described above, the upper end part of the first display unit 100 can be pulled forward without pulling the lower end part of the first display unit forward (that is, a display unit to be replaced can be pulled out by turning the upper end part about the lower end part), thus, the first display unit 100 can be removed without damaging the canopy section 41 of the second display unit 200. In the case of using the display system 1000 in an outdoor environment, by inclining the outer shape of the main body 42 of the case 40, water can be lead to the back surface side, so that the amount of water attached to the light-emitting elements 20 can be reduced. Consequently, reduction in the display quality can be suppressed.

In order simply to cover the gap 50 between the main bodies 42 of the cases 40 of vertically-arranged display units, instead of providing the canopy section 41 at an upper portion of the main body 42 of the lower display unit, a canopy section with a projecting portion projecting downward may be provided on the main body 42 of the case 40 of the higher display unit. However, in the latter case (the canopy covering the gap 50 is provided at a lower end of the main body 42 of the case 40 of the display unit arranged above) according to the present embodiment, when the display system is seen from obliquely below at the front side, a new gap occurs between the projecting portion of the canopy section that covers the gap 50 and the front surface 42a of the main body 42 of the case 40 of the display unit arranged below. This new gap may become noticeable in a dark color. Further, in the latter case, when a plurality of display units of the same shapes are vertically arranged, the display system has an inferior display quality, because there exists no canopy section that blocks external light reaching the plurality of light-emitting elements 20 arranged in the uppermost row of the display unit arranged at the uppermost. Therefore, the former case (the canopy 41 covering the gap 50 is provided in the main body 42 of the case 40 of the display unit arranged below) according to the present embodiment is preferable.

Second Embodiment

A display system 2000 according to the second embodiment will be described with reference to FIG. 5A to FIG. 8.

Figure 5B:
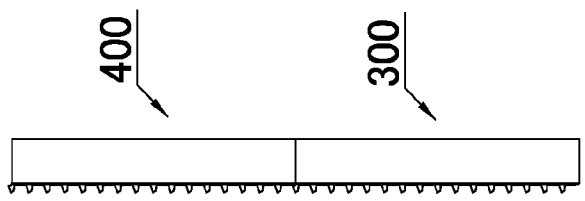
FIG. 5B is a side view seen from the side.
Figure 5A:
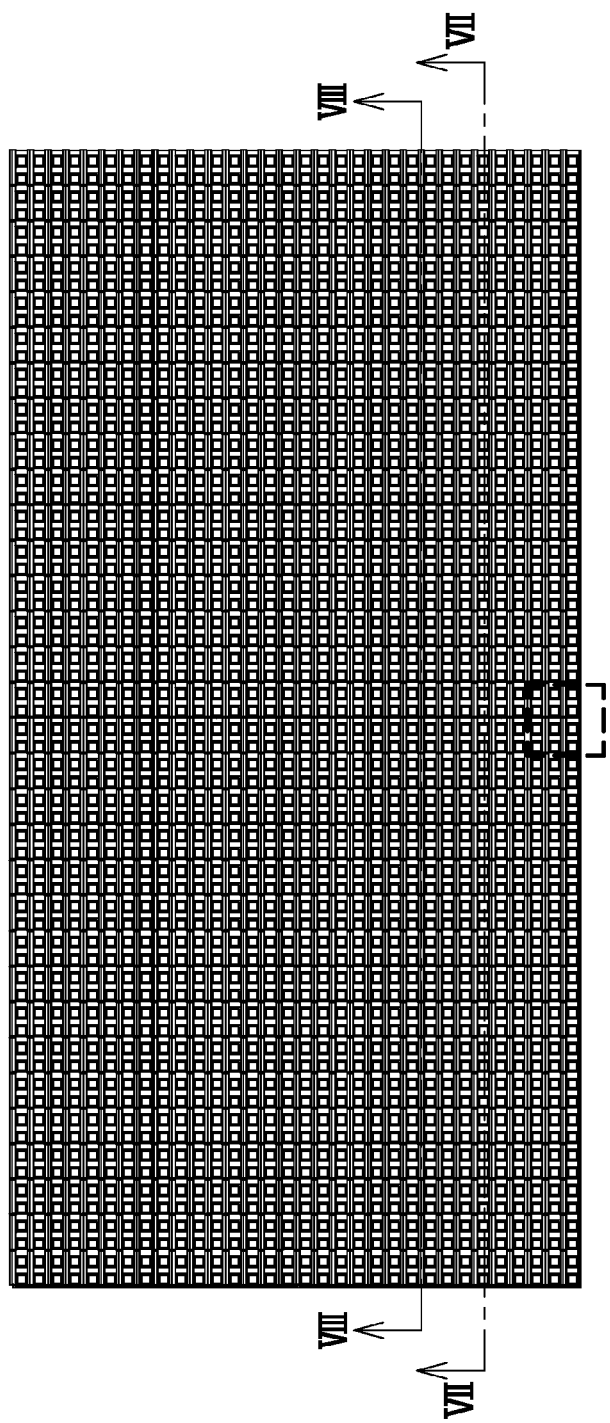
FIG. 5A is a plan view seen from the front side.
Figure 5C:
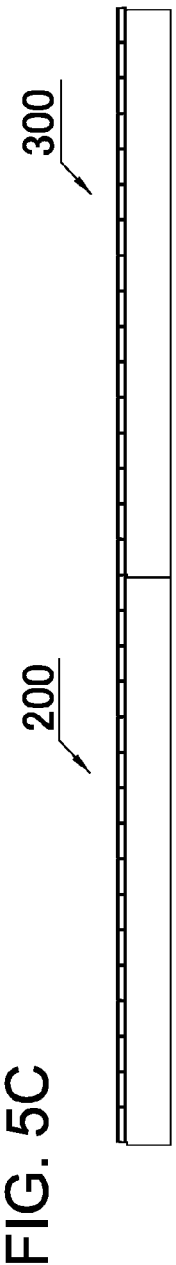
FIG. 5C is a bottom view seen from below of a display system according to a second embodiment.
Figure 6:
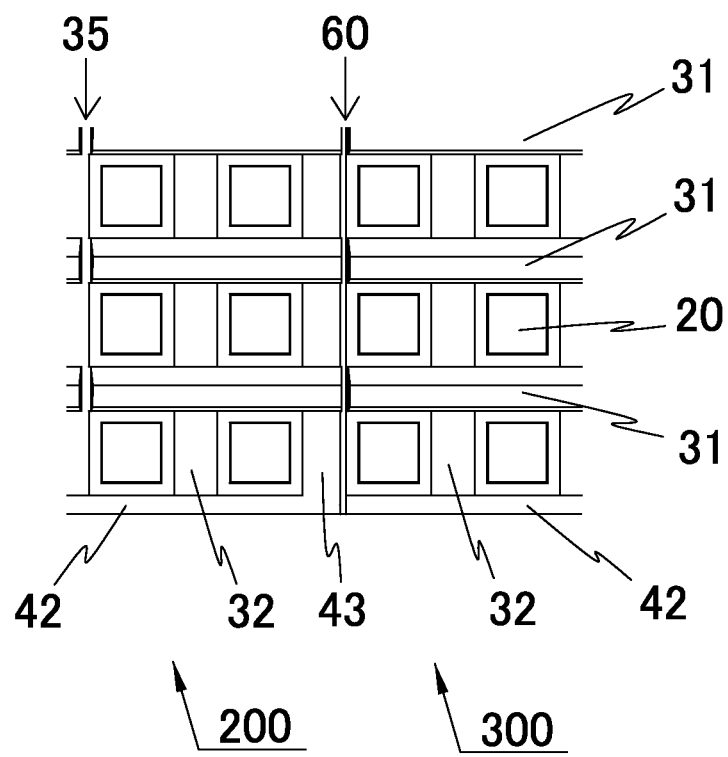
FIG. 6 is an enlarged plan view of a region surrounded by a dotted line in FIG. 5A.
Figure 7:
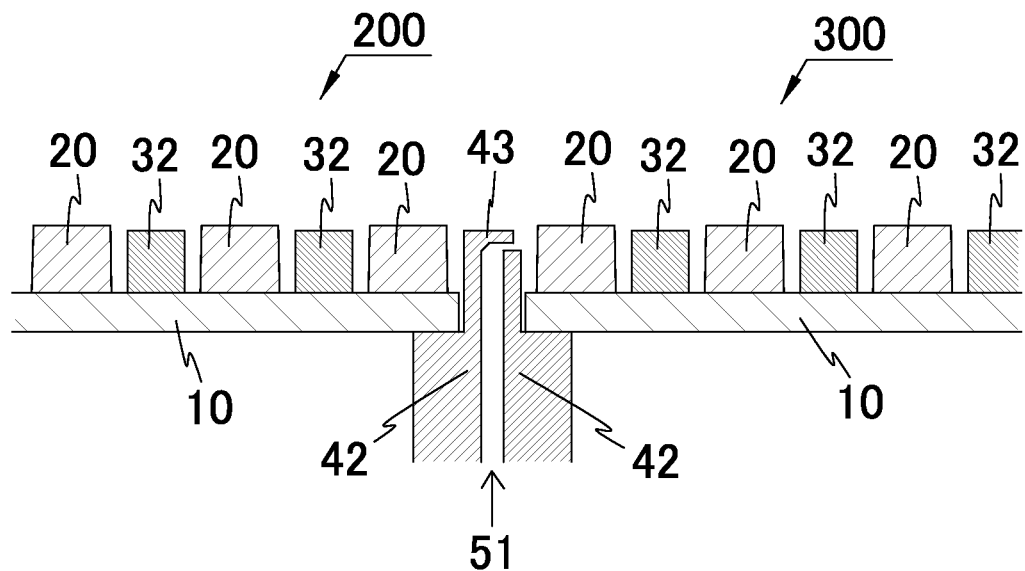
FIG. 7 is an enlarged cross-sectional view of a center region of the display system taken along line VII-VII in FIG. 5A.
Figure 8:
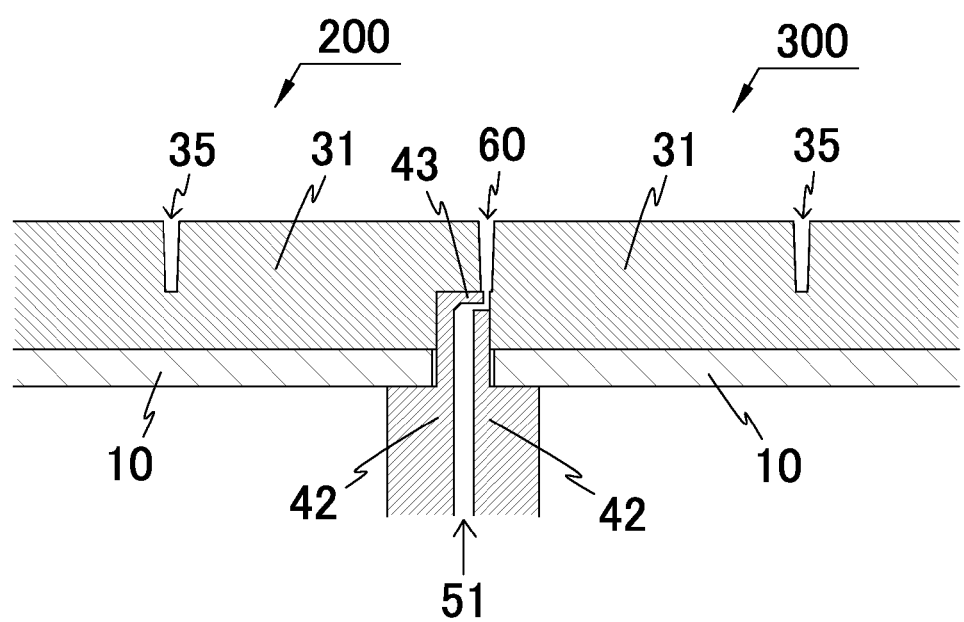
FIG. 8 is an enlarged cross-sectional view of a center region of the display system taken along line VIII-VIII in FIG. 5A.

FIG. 5A is a plan view of the display system 2000 seen from the front side, FIG. 5B is a side view of the display system 2000 seen from the side, and FIG. 5C is a bottom view of the display system 2000 seen from below. FIG. 6 is an enlarged plan view of a region surrounded by a dotted line in FIG. 5A. FIG. 7 is an enlarged sectional view of a center region of the display system 2000 of a sectional view along a line VII-VII in FIG. 5A (a line that passes through a plurality of light-emitting elements 200 arranged laterally). FIG. 8 is an enlarged sectional view of a center region of the display system 2000 of a sectional view along a line VIII-VIII in FIG. 5A (a line that crosses the canopy section 31). The display system 2000 has substantially the same configuration as that of the display system 1000 except that, in addition to the first display unit 100 and the second display unit 200, a third display unit 300 and a fourth display unit 400 are provided and that a side projecting portion 43 is provided at the main body 42 side of the case 40 of the display unit (100, 200, 300, 400).

As shown in FIG. 5A to FIG. 8, the display system 2000 includes the third display unit 300 and the fourth display unit 400, each including the substrate 10 having a plurality of the light-emitting elements 20 arranged in each of a plurality of rows, the mask 30 disposed at the front side of the substrate 10, and the case 40 having the main body 42 supporting the substrate 10 from a back side of the substrate 10. The third display unit 300 is disposed at the side of the second display unit 200 such that a gap 51 is defined between the main body 42 of the case 40 of the second display unit 200 and the main body 42 of the case 40 of the third display unit 300. Further, the fourth display unit 400 is disposed at the side of the first display unit 100 such that the gap 51 is defined between the main body 42 of the case 40 of the first display unit 100 and the main body 42 of the case 40 of the fourth display unit 400. The fourth display unit 400 is provided above the third display unit 300 such that the gap 50 is defined between the main body 42 of the case 40 of the fourth display unit 400 and the main body 42 of the case 40 of the third display unit 300.

In a similar manner to that of the mask 30 of the second display unit 200 according to the first embodiment, the mask 30 of the second display unit 200 according to the second embodiment includes a plurality of canopy sections 31 each disposed above and along each of the plurality of rows of the plurality of light-emitting elements 20 except for an uppermost row, and a plurality of rib sections 32 that connect between adjacent canopy sections 31 in the column direction in the second display unit 200.

In the uppermost part (the first display unit 100 side) of the main body 42 of the case 40 of the second display unit 200, in a similar manner to that in the first embodiment, there is provided the canopy section 41 that entirely covers the gap 50 between the main body 42 of the case 40 of the first display unit 100 and the main body 42 of the case 40 of the second display unit 200. At the third display unit 300 side of the main body 42 of the case 40 of the second display unit 200, as shown in FIG. 7 and FIG. 8, there is provided the side projecting portion 43 projecting to the third display unit 300 side so as to entirely cover the gap 51 between the main body 42 of the case 40 of the second display unit 200 and the main body 42 of the case 40 of the third display unit 300. Accordingly, because both the gap 50 and the gap 51 are covered, the display quality can be further improved. Because the side projecting portion 43 also projects to the side from the canopy section 41 of the second display unit 200, the side projecting portion 43 also covers the gap of the region where the gap 50 and the gap 51 cross.

The side projecting portion 43 of the second display unit 200 is provided at the front side of the main body 42 of the case 40 of the second display unit 200, and is preferably positioned at the front side of the front surface 42a of the main body 42 of the case 40 of the third display unit 300, as shown in FIG. 7 and FIG. 8. In the sectional view in the vertical and front and back directions of the display system 2000, the side projecting portion 43 can also have an inclined surface extended obliquely to the front side from the front end part of the outer side surface of the main body 42, and a horizontal surface adjacent to the inclined surface and extended laterally. In order not to block the light from the light-emitting element 20, the side projecting portion 43 is preferably positioned at the back side of the front surface of the light-emitting element 20. In order to prevent reduction in the display quality, the side projecting portion 43 has a width in the side direction preferably the same as the width of the rib section 32, and further, has a material, a shape, and a surface processing preferably the same as those of the rib section 32. A material of the side projecting portion 43 is a light-shielding polycarbonate resin colored in black, for example. Although a shape of the surface (the front side surface) of the side projecting portion 43 is not limited, when the side projecting portion 43 has the same shape as that of the surface of the rib section 32, reduction in the display quality can be suppressed.

The side projecting portion 43 of the second display unit 200 can also cover the main body 42 of the case 40 of the third display unit 300. In this case, when replacing a specific display unit, there is a possibility of the occurrence of a problem similar to that described in the first embodiment. In order to solve this problem, a method similar to that described in the first embodiment can be used. That is, the outer shape of the main body 42 of the case 40 of the display unit (in the second embodiment, the width in the lateral direction in FIG. 7 and FIG. 8) may be set narrower backward at stages or in an inclined manner.

The side projecting portion 43 of the second display unit 200 is preferably continuously extended from the upper end part to the lower end part of the main body 42 of the case 40. Accordingly, because all the gaps 51 extended in the vertical direction are covered, noticeability of the gaps 51 can be entirely suppressed.

As shown in FIG. 8, the canopy section 31 of the second display unit 200 can be extended to the third display unit 300 side to cover the side projecting portion 43. Accordingly, a gap 60 generated between the mask 30 of the second display unit 200 and the mask 30 of the third display unit 300 can be narrowed, and reduction in the display quality can be suppressed. However, it is not possible to eliminate the gap 60 generated between the mask 30 of the second display unit 200 and the mask 30 of the third display unit 300. Therefore, there remains the problem that the gap 60 is noticeable when the display system is seen from the front side. Accordingly, by providing a slit 35 of the same shape as that of the gap 60 at a predetermined interval from the gap 60 in the canopy section 31 of each mask 30 of the second display unit 200 and the third display unit 300, reduction in the display quality can be suppressed. Needless to mention, the slit 35 can be provided in not only the canopy section 31 but also in the canopy section 41. Because the slit 35 provided in the canopy section 41 has the same interval and the same shape as those of the slit provided in the canopy section 31, reduction in the display quality of the display system can be suppressed.

In the first display unit 100, the third display unit 300, and the fourth display unit 400, in a similar manner to that of the second display unit 200, there may be also provided the canopy section 41 that at least partially covers the gap 50 between the main body 42 of the case 40 and the main body 42 of the case 40 of other display unit to be arranged above. Alternatively, there may be provided the side projecting portion 43 at least partially covering the gap 51 between the main body 42 of the case 40 and the main body 42 of the case 40 of other display unit to be arranged at the side.

In the second embodiment, as shown in FIG. 7 and FIG. 8, there is provided the side projecting portion 43 projecting to a third display unit 300 side so as to cover the gap 51 in the main body 42 of the case 40 of the second display unit 200. Alternatively, there can be provided a side projecting portion projecting to a second display unit 200 side so as to entirely cover the gap 51 in the main body 42 of the case 40 of the third display unit 300. Needless to mention, a side projecting portion projecting from the third display unit 300 to a second display unit 200 side can be also configured to cover a part of the gap 51. In this case, although it is not possible to entirely hide the gap 51 when seen from the front side, the display quality can be improved in a certain degree.

In the second embodiment, the case 40 of the second display unit 200 is configured to cover both the gap 50 and the gap 51. Alternatively, the case 40 of the second display unit 200 can be configured to cover only the gap 51. In this case, although the gap 50 looks dark, noticeability of the gap 51 can be suppressed. This is similarly applied to the fourth embodiment.

In the second embodiment, there is provided the display system 2000 including the first display unit, the second display unit 200, the third display unit 300, and the fourth display unit 400, as shown in FIGS. 5A and 5B. Alternatively, there may be provided a display system including the first display unit 100, the second display unit 200, and the third display unit 300, without arranging the fourth display unit 400, or there may be provided a display system including the second display unit 200 and the third display unit 300, without arranging the first display unit 100 and the fourth display unit 400, for example. This is similarly applied to the fourth embodiment described below.

Third Embodiment

Figure 9A:
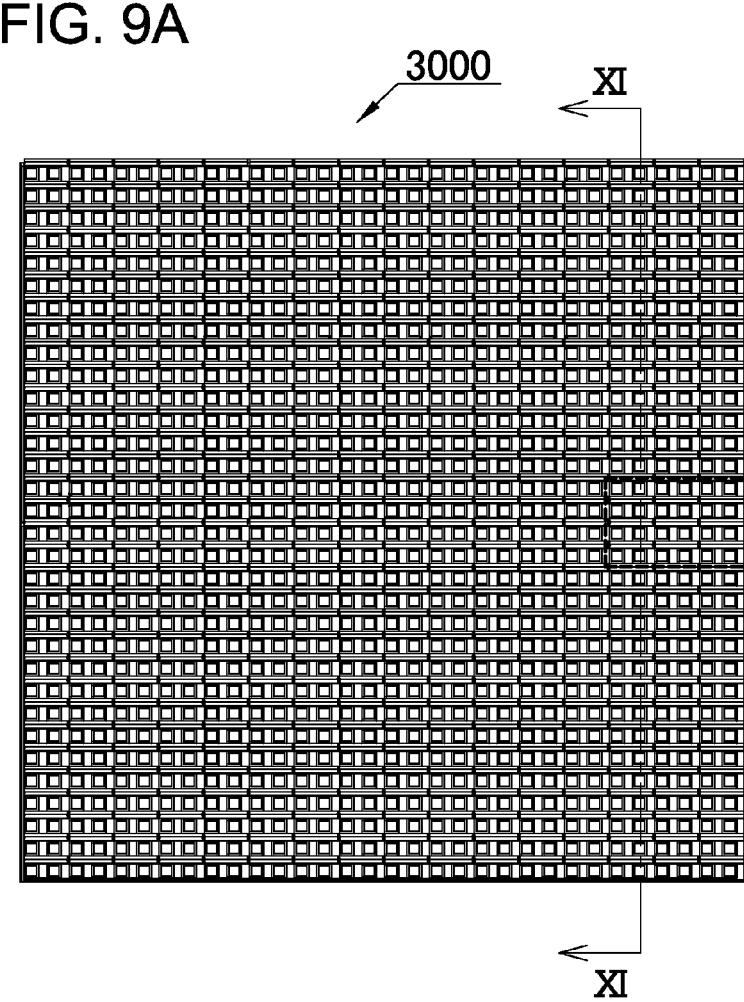
FIG. 9A is a plan view seen from the front side.
Figure 9B:
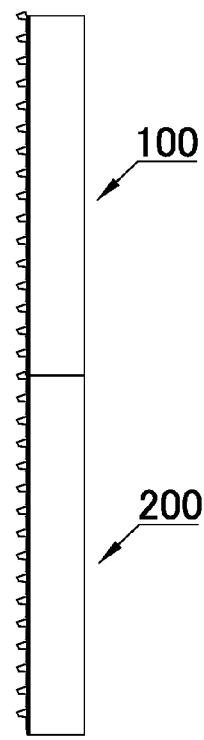
FIG. 9B is a side view seen from the side.
Figure 9C:
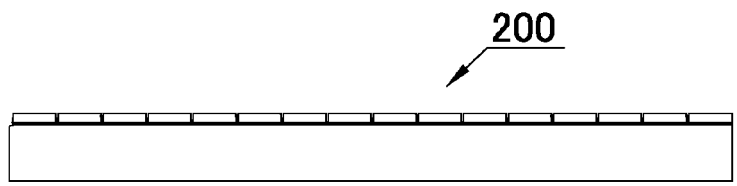
FIG. 9C is a bottom view seen from below respectively of a display system according to a third embodiment.
Figure 10:
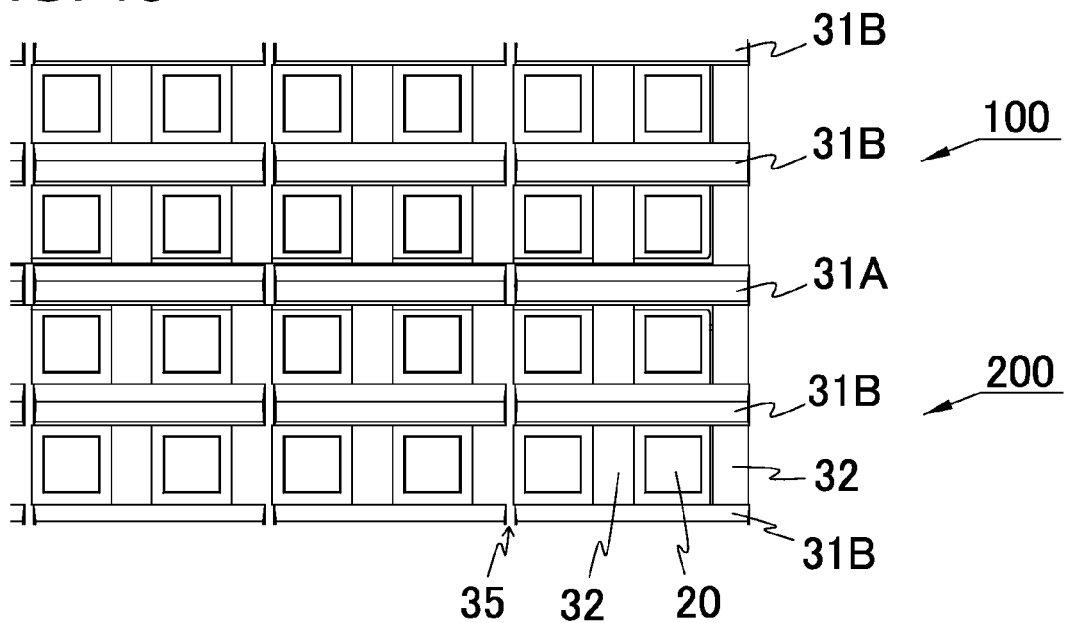
FIG. 10 is an enlarged plan view of a region surrounded by a dotted line in FIG. 9A.
Figure 11:
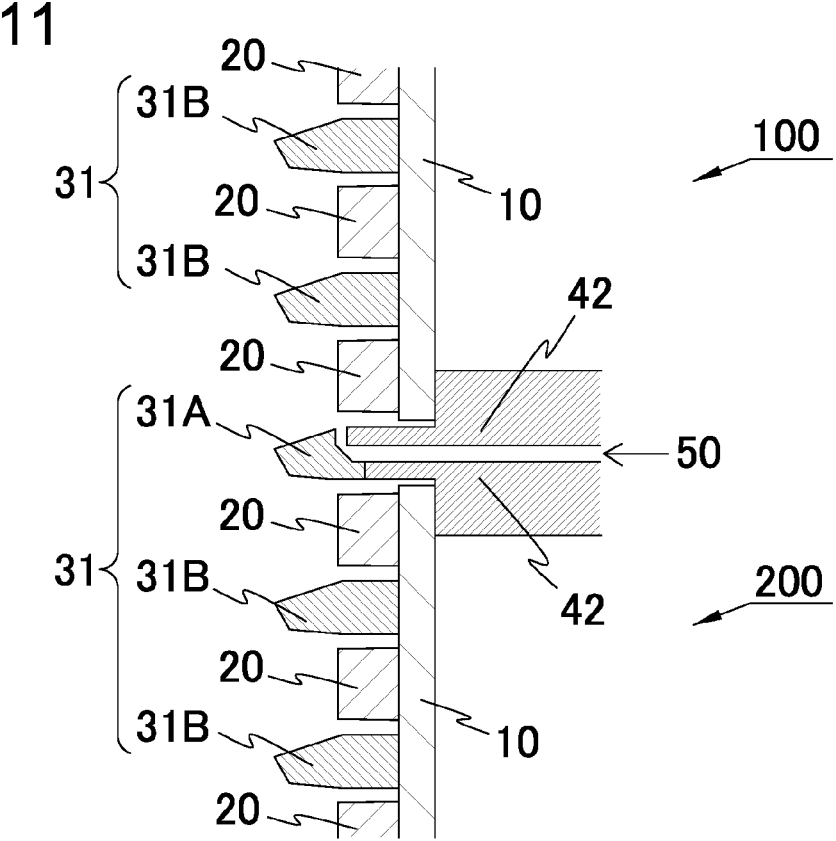
FIG. 11 is an enlarged cross-sectional view of a center region of the display system taken along line XI-XI in FIG. 9A.

A display system 3000 according to the third embodiment will be described with reference to FIG. 9A to FIG. 11. FIG. 9A is a plan view of the display system 3000 seen from the front side, FIG. 9B is a side view of the display system 3000 seen from the side, and FIG. 9C is a bottom view of the display system 3000 seen from below. FIG. 10 is an enlarged plan view of a region surrounded by a dotted line in FIG. 9A. FIG. 11 is an enlarged sectional view of a center region of the display system 3000 of a sectional view along a line XI-XI in FIG. 9A (a line that passes through a plurality of light-emitting elements arranged in an upper/lower direction). The display system 3000 has substantially the same configuration as that of the display system 1000 according to the first embodiment, except that the canopy section covering the gap 50 has been changed from the canopy section 41 of the case 40 to a canopy section 31A of the mask 30. A shape of the canopy section 31A can be the same as the shape of the canopy section 41 described in the first embodiment, and therefore, redundant description will be omitted in the third embodiment.

As shown in FIG. 9A to FIG. 11, the display system 3000 includes the first display unit 100 and the second display unit 200, each including the substrate 10 having a plurality of the light-emitting elements 20 arranged in each of a plurality of rows, the mask 30 disposed at the front side of the substrate 10, and the case 40 provided at a back side of the substrate 10. The first display unit 100 is arranged above the second display unit 200 such that the gap 50 is defined between the case 40 of the first display unit 100 and the case 40 of the second display unit 200. The mask 30 of each of the first display unit 100 and the second display unit 200 includes a plurality of the canopy sections 31 each disposed above the plurality of light-emitting elements 20 arranged along each of the rows. The canopy section 31A at an uppermost of the plurality of canopy sections 31 which are provided on the mask 30 of the second display unit 200 is configured to entirely cover the gap 50 when seen from the front side.

According to the display system 3000, as shown in FIG. 11, because the gap 50 is entirely covered by the canopy section 31A at the uppermost among the plurality of canopy sections 31 of the second display unit 200 at the front side of the gap 50, the shadow generated in the gap 50 is not so noticeable.

As shown in FIG. 11, the canopy section 31A of the mask 30 of the second display unit 200 entirely covers the gap 50 when seen from the front side, and can further cover the front surface 42a of the main body 42 of the case 40 of the first display unit 100.

Improvement of water proof performance is a main aim in the third embodiment, so that a sidewall that surrounds the substrate 10 is provided on the main body 42 of the case 40 (refer to FIG. 11), but in the case where the water proof performance is not necessarily required to be strict, the side wall can be omitted. This is similarly applied to the fourth embodiment described below.

In the third embodiment, the first display unit 100 is also configured such that the canopy section 31A at the uppermost among the plurality of canopy sections 31 provided in the mask 30 covers the gap between the first display unit 100 and other display unit to be arranged above. Accordingly, it is possible to securely suppress the gap 50 from becoming noticeable when the display system is seen from the front side. Needless to mention, the canopy section 31A can be also configured to cover a part of the gap 50. In this case, when the display system is seen from the front side, the gap 50 cannot be entirely shadow. However, the display quality can be improved in a certain degree. Further, as shown in FIG. 11, the canopy section 31A of the second display unit 200 can be also extended to cover the front surface 42a of the main body 42 of the case 40 of the first display unit 100.

A method of manufacturing the display system 3000 according to the third embodiment will be described. For the first display unit 100 according to the third embodiment, first, there are prepared the substrate 10 having a plurality of the light-emitting elements 20 arranged in each of a plurality of rows, the mask 30 having a plurality of the canopy sections 31 each disposed above and along each of the plurality of rows of the plurality of light-emitting elements 20, and the case 40. Next, the case 40 is disposed at the back side of the substrate 10, and the mask 30 is disposed at the front side of the substrate 10. The first display unit 100 is manufactured by screwing the substrate 10, the mask 30, and the case 40 to be integrated together. The second display unit 200 according to the third embodiment is also manufactured by a method similar to that of manufacturing the first display unit 100 according to the third embodiment. After manufacturing the first display unit 100 and the second display unit 200, the first display unit 100 is arranged above the second display unit 200 such that the gap 50 is defined between the case 40 of the first display unit 100 and the case 40 of the second display unit 200, thereby manufacturing the display system 3000. At this time, the canopy section 31A at the uppermost among the plurality of canopy sections 31 provided in the mask 30 of the second display unit 200 is configured to entirely cover the gap 50.

Fourth Embodiment

Figure 13:
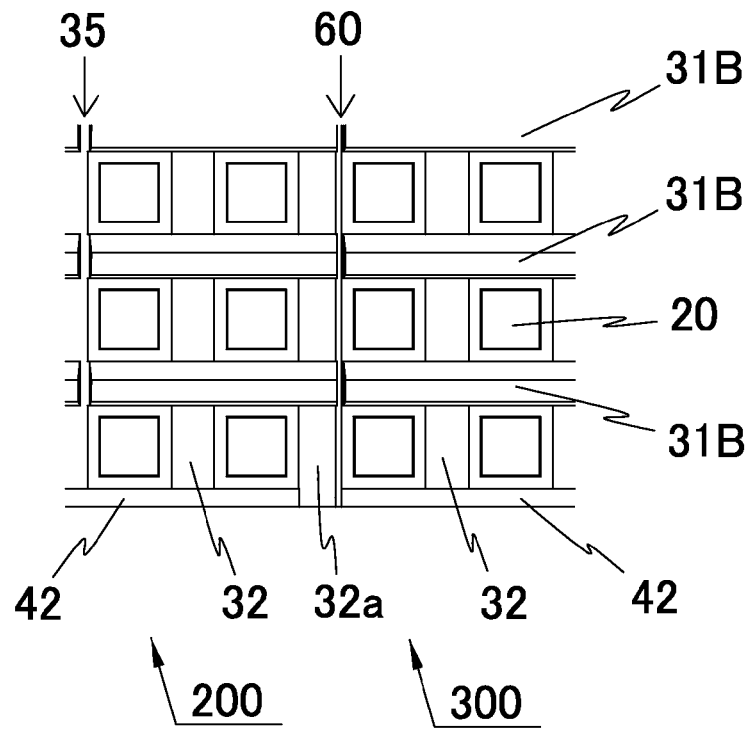
FIG. 13 is an enlarged plan view of a region surrounded by a dotted line in FIG. 12A.
Figure 14:
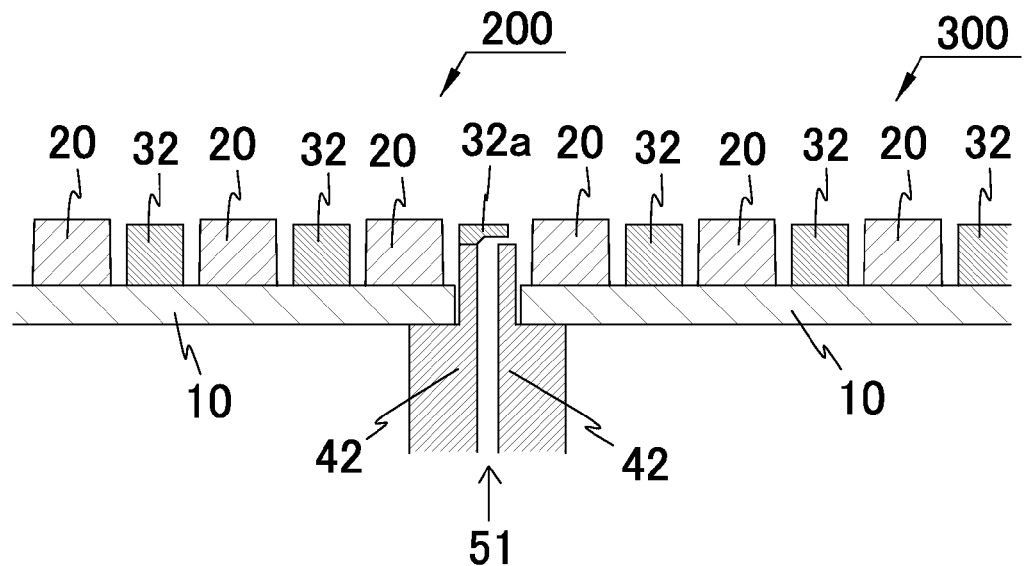
FIG. 14 is an enlarged cross-sectional view of a center region of the display system taken along line XIV-XIV in FIG. 12A.
Figure 15:
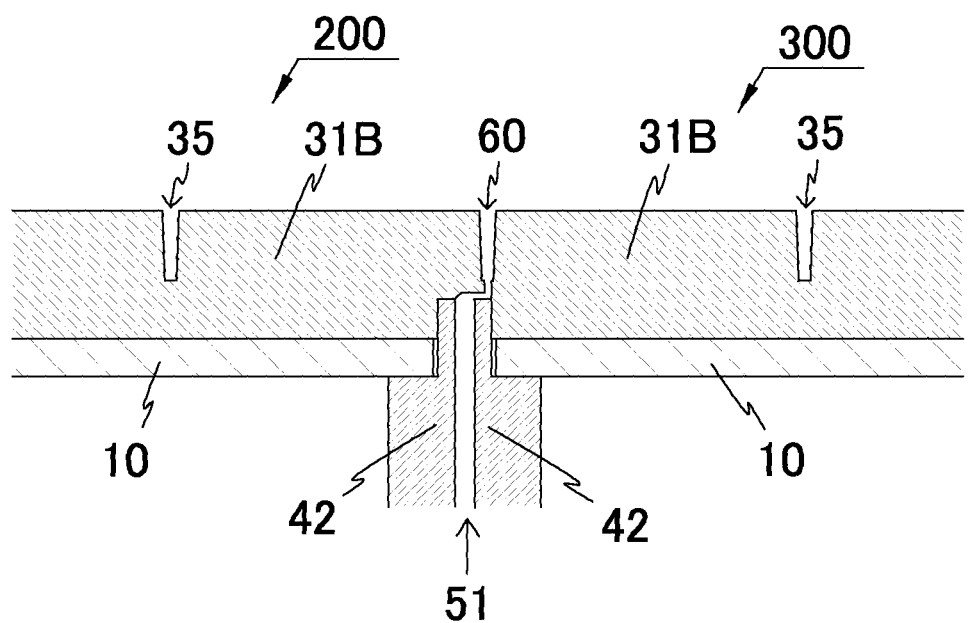
FIG. 15 is an enlarged cross-sectional view of a center region of the display system taken along line XV-XV in FIG. 12A.

A display system 4000 according to the fourth embodiment will be described with reference to FIG. 12A to FIG. 15. FIG. 12A is a plan view of the display system 4000 seen from the front side, FIG. 12B is a side view of the display system 4000 seen from the side, and FIG. 12C is a bottom view of the display system 4000 seen from below. FIG. 13 is an enlarged plan view of a region surrounded by a dotted line in FIG. 12A. FIG. 14 is an enlarged sectional view of a center region of the display system 4000 of a sectional view along a line XIV-XIV in FIG. 12A (a line that passes through a plurality of the light-emitting elements 20 arranged laterally). FIG. 15 is an enlarged sectional view of a center region of the display system 4000 of a view along a line XV-XV in FIG. 12A (a line that crosses a canopy section 31B). The display system 4000 has substantially the same configuration as that of the display system 2000 according to the second embodiment, except that, instead of the side projecting portion 43 of the case 40 according to the second embodiment, the mask 30 as a whole is configured to extend from the main body 42 of the case 40 to the third display unit 300 side so as to cover the gap 51.

As shown in FIG. 12A to FIG. 15, the display system 4000 includes the third display unit 300 and the fourth display unit 400, each including the substrate 10 having a plurality of the light-emitting elements 20 arranged in each of a plurality of rows, the mask 30 disposed at the front side of the substrate 10, and the case 40 provided at a back side of the substrate 10. The third display unit 300 is disposed at the side of the second display unit 200 such that the gap 51 is defined between the case 40 of the second display unit 200 and the case 40 of the third display unit 300. Further, the fourth display unit 400 is disposed at the side of the first display unit 100 such that the gap 51 is defined between the main body 42 of the case 40 of the first display unit 100 and the main body 42 of the case 40 of the fourth display unit 400. The fourth display unit 400 is arranged above the third display unit 300 such that the gap 50 is defined between the main body 42 of the case 40 of the fourth display unit 400 and the main body 42 of the case 40 of the third display unit 300.

In the fourth embodiment, the mask 30 of the second display unit 200 is configured such that the canopy section 31A positioned at the uppermost entirely covers the gap 50, in a similar manner to that in the third embodiment. Further, the mask 30 of the second display unit 200 is configured such that the mask 30 as a whole entirely covers the gap 51 at the end part of the third display unit 300 side. Further, as shown in FIG. 14 and FIG. 15, when the rib section 32a exists at the side end of the mask 30 of the second display unit 200, the mask 30 as a whole (the canopy section 31A, the canopy section 31B, and the rib section 32a) may be configured to entirely cover the gap 51. Accordingly, the mask 30 can cover the gap 50 and the gap 51, and the display quality can be further improved.

As shown in FIG. 14, preferably, the rib section 32a of the second display unit 200 is disposed to the front side separated from the front surface 42a of the main body 42 of the third display unit 300. Accordingly, because a space exists between the rib section 32a of the second display unit 200 and the front surface 42a of the main body 42 of the case 40 of the third display unit 300, it is possible to suppress the rib section 32a of the second display unit 200 from being damaged at the time of installing the display unit. Further, from the viewpoint of suppressing reduction in the display quality, it is preferable that the rib section 32a is provided not to generate a recess when seen from the front side. Further, it is preferable that the rib section 32a has the same lateral width as that of the rib section 32 when seen from the front side, and has the same height from the substrate 10 as the height of the rib section 32.

As shown in FIG. 15, in order to suppress reduction in the display quality due to a difference between the heights of the canopy sections 31B of the second display unit 200, it is preferable that the canopy sections 31B are extended to the third display unit 300 side with the heights being matched, and cover the gap 51. By constituting the canopy section 31B of the second display unit 200 to cover the gap 51, it is possible to suppress the gap 51 from becoming noticeable. However, there is a risk of reduction in the display quality because a new gap 60 occurs between the canopy section 31B of the second display unit 200 and the canopy section 31B of the third display unit 300. Accordingly, by providing, at the canopy sections 31B, the slit 35 of the same shape as that of the gap 60 at a predetermined interval from the gap 60, reduction in the display quality can be suppressed.

In the fourth embodiment, the mask in which the rib section 32a exists at the side end is used (refer to FIG. 13A to FIG. 13C). However, a mask in which the rib section 32a does not exist at the side end can be also used. In the case of using the mask in which the rib section 32a does not exist, the region of each gap 51 that cannot be covered by the extended portion of the mask 30 (the canopy sections 31A and 31B) can be also covered by providing a side projecting portion projecting to the third display unit 300 side in the main body 42 of the case 40.

The first display unit 100, the third display unit 300, and the fourth display unit 400 may be also configured, in a similar manner to that of the second display unit 200, such that the canopy section 31A at the uppermost of the mask 30 at least partially covers the gap between the corresponding display unit and other display unit to be arranged above, and further, the mask 30 at least partially covers the gap between the corresponding display unit and other display unit to be arranged at the side.

In the fourth embodiment, as shown in FIG. 13A to FIG. 13C, the mask 30 of the second display unit 200 is configured to entirely cover the gap 51 at the end part of the third display unit 300 side. However, without limiting to this configuration, the mask 30 of the third display unit 300 may be configured to entirely cover the gap 51 at the end part of the second display unit 200 side. Needless to mention, the mask of the third display unit 300 can be also configured to cover a part of the gap 51. In this case, although it is not possible to entirely hide the gap 51 when seen from the front side, the display quality can be improved in a certain degree.

In the fourth embodiment, the mask 30 covers both the gap 50 and the gap 51 (the canopy section 31A of the mask of the second display unit 200 covers the gap 50, and the mask 30 as a whole of the second display unit 200 is extended to the side to cover the gap 51). However, without changing that the mask 30 as a whole of the second display unit 200 covers the gap 51, the canopy section that covers the gap 50 can be replaced from the canopy section 31A of the mask 30 with the canopy section 41 of the case. This is similarly applied to the second embodiment. That is, in the second embodiment, the case 40 covers both the gap 50 and the gap 51 (the canopy section 41 of the case 40 of the second display unit 200 covers the gap 50, and the side projecting portion 43 of the case 40 covers the gap 51). However, without changing that the side projecting portion 43 of the case 40 covers the gap 51, the canopy section that covers the gap 50 can be replaced from the canopy section 41 of the case 40 with the canopy section 31A of the mask 30.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A display system comprising:
 a first display unit and a second display unit, each including:
 a substrate having a plurality of light-emitting elements arranged in each of a plurality of rows;
 a mask disposed at a front side of the substrate; and
 a case having a main body supporting the substrate from a back side of the substrate,
 wherein the first display unit is arranged above the second display unit such that a gap is defined between the main body of the case of the first display unit and the main body of the case of the second display unit,
 wherein the mask of the second display unit comprises a plurality of canopy sections each disposed above and along each of the plurality of rows of the plurality of light-emitting elements except for an uppermost row, and
 wherein the main body of the case of the second display unit comprises a canopy section that is positioned above and along the plurality of light-emitting elements arranged in the uppermost row of the second display unit and that at least partially covers the gap.

2. The display system according to claim 1, wherein the canopy section provided on the main body of the case of the second display unit entirely covers the gap.

3. A display system comprising:
 a first display unit and a second display unit, each including:
 a substrate having a plurality of light-emitting elements arranged in each of a plurality of rows;
 a mask disposed at a front side of the substrate; and
 a case disposed at a back side of the substrate;
 wherein the first display unit is arranged above the second display unit such that a gap is defined between the case of the first display unit and the case of the second display unit,
 the mask includes a plurality of canopy sections each disposed above the plurality of light-emitting elements arranged along each of the rows, and
 a canopy section at an uppermost of the plurality of canopy sections which are provided on the mask of the second display unit is configured to at least partially cover the gap.

4. The display system according to claim 3, wherein the canopy section at an uppermost of the plurality of canopy sections provided on the mask of the second display unit is configured to entirely cover the gap.

5. The display system according to claim 1, wherein a front side of the canopy section at an uppermost of the plurality of canopy sections of the second display unit has a same shape with a shape of a front side of other canopy sections disposed below the uppermost canopy section.

6. The display system according to claim 3, wherein a front side of the canopy section at an uppermost of the plurality of canopy sections of the second display unit has a same shape with a shape of a front side of other canopy sections disposed below the uppermost canopy section.

7. The display system according to claim 1, further comprising:
 a third display unit including:
 a substrate having a plurality of light-emitting elements arranged in each of a plurality of rows;
 a mask disposed at a front side of the substrate; and
 a case having a main body supporting the substrate from a back side of the substrate,
 wherein the third display unit is disposed at a side of the second display unit such that a gap is defined between the main body of the case of the second display unit and the main body of the case of the third display unit, and
 wherein a side-projecting section is provided to the main body of the case of the second display unit, projecting toward a third display unit to at least partially cover the gap between the main body of the case of the second display unit and the main body of the case of the third display unit; or
 a side-projecting section is provided to the main body of the case of the third display unit, projecting toward the second display unit to at least partially cover the gap between the main body of the case of the second display unit and the main body of the case of the third display unit.

8. The display system according to claim 3, further comprising:
 a third display unit including:
 a substrate having a plurality of light-emitting elements arranged in each of a plurality of rows;
 a mask disposed at a front side of the substrate; and
 a case having a main body supporting the substrate from a back side of the substrate,
 wherein the third display unit is disposed at a side of the second display unit such that a gap is defined between the main body of the case of the second display unit and the main body of the case of the third display unit, and
 wherein a side-projecting section is provided to the main body of the case of the second display unit, projecting toward a third display unit to at least partially cover the gap between the main body of the case of the second display unit and the main body of the case of the third display unit; or
 a side-projecting section is provided to the main body of the case of the third display unit, projecting toward the second display unit to at least partially cover the gap between the main body of the case of the second display unit and the main body of the case of the third display unit.

9. The display system according to claim 7, wherein
 the side-projecting section provided to the main body of the case of the second display unit entirely covers the gap between the main body of the case of the second display unit and the main body of the case of the third display unit; or
 the side-projecting section provided to the main body of the case of the third display unit entirely covers the gap between the main body of the case of the second display unit and the main body of the case of the third display unit.

10. The display system according to claim 8, wherein
 the side-projecting section provided to the main body of the case of the second display unit entirely covers the gap between the main body of the case of the second display unit and the main body of the case of the third display unit; or the side-projecting section provided to the main body of the case of the third display unit entirely covers the gap between the main body of the case of the second display unit and the main body of the case of the third display unit.

11. The display system according to claim 1, further comprising:
a third display unit including:
a substrate having a plurality of light-emitting elements arranged in each of a plurality of rows;
a mask disposed at a front side of the substrate; and
a case disposed at a rear side of the substrate,
wherein the third display unit is disposed at a side of the second display unit such that a gap is defined between the case of the second display unit and the case of the third display unit, and
wherein the mask of the second display unit is configured to at least partially cover the gap between the second display unit and the third display unit at an end portion of the third display unit side; or the mask of the third display unit is configured to at least partially cover the gap between the second display unit and the third display unit at an end portion of the second display unit side.

12. The display system according to claim 3, further comprising:
a third display unit including:
a substrate having a plurality of light-emitting elements arranged in each of a plurality of rows;
a mask disposed at a front side of the substrate; and
a case disposed at a rear side of the substrate,
wherein the third display unit is disposed at a side of the second display unit such that a gap is defined between the case of the second display unit and the case of the third display unit, and
wherein the mask of the second display unit is configured to at least partially cover the gap between the second display unit and the third display unit at an end portion of the third display unit side; or the mask of the third display unit is configured to at least partially cover the gap between the second display unit and the third display unit at an end portion of the second display unit side.

13. The display system according to claim 11, wherein
the mask of the second display unit is configured to entirely cover the gap between the second display unit and the third display unit at an end portion of the third display unit side; or the mask of the third display unit is configured to entirely cover the gap between the second display unit and the third display unit at an end portion of the second display unit side.

14. The display system according to claim 12, wherein
the mask of the second display unit is configured to entirely cover the gap between the second display unit and the third display unit at an end portion of the third display unit side; or the mask of the third display unit is configured to entirely cover the gap between the second display unit and the third display unit at an end portion of the second display unit side.

15. The display system according to claim 1, wherein each of the canopy sections at least partially covering the gap includes an upper projection portion projecting upward from an upper-side outer surface of the main body of the case, and the upper projecting portion includes a first surface 41$a$ extended obliquely upward at a first angle toward the front side from the front end part of the upper-side outer surface of the main body, and a second surface 41$b$ adjoins the first surface 41$a$ at an upper side, extended obliquely upward or upward at a second angle and also facing a front surface of the main body of the case of the first display unit.

16. The display system according to claim 3, wherein each of the canopy sections at least partially covering the gap includes an upper projection portion projecting upward from an upper-side outer surface of the main body of the case, and the upper projecting portion includes a first surface 41$a$ extended obliquely upward at a first angle toward the front side from the front end part of the upper-side outer surface of the main body, and a second surface 41$b$ adjoins the first surface 41$a$ at an upper side, extended obliquely upward or upward at a second angle and also facing a front surface of the main body of the case of the first display unit.

17. The display system according to claim 7, wherein a slit of a same shape as a shape of the gap is provided at a predetermined interval from the gap 51 in the canopy section of each mask of the second display unit and the third display unit.

18. The display system according to claim 8, wherein a slit of a same shape as a shape of the gap is provided at a predetermined interval from the gap 51 in the canopy section of each mask of the second display unit and the third display unit.

19. The display system according to claim 11, wherein a slit of a same shape as a shape of the gap is provided at a predetermined interval from the gap 51 in the canopy section of each mask of the second display unit and the third display unit.

20. The display system according to claim 12, wherein a slit of a same shape as a shape of the gap is provided at a predetermined interval from the gap 51 in the canopy section of each mask of the second display unit and the third display unit.

* * * * *